United States Patent [19]

Lovik

[11] Patent Number: 5,004,633

[45] Date of Patent: Apr. 2, 1991

[54] BALLOON DECORATIVE DEVICES, METHODS AND KITS

[76] Inventor: Craig J. Lovik, 8565 Custer School Rd., Custer, Wash. 98240

[21] Appl. No.: 357,322

[22] Filed: May 24, 1989

[51] Int. Cl.[5] .......................... A63H 27/10; B64B 1/40

[52] U.S. Cl. .......................................... 428/9; 244/31; 428/12; 446/221; 446/227

[58] Field of Search .................. 40/214; 446/220, 221, 446/222, 223, 224, 225, 226, 227; 244/31, 32, 33; 428/7, 9, 12

[56] References Cited

U.S. PATENT DOCUMENTS

| | | | |
|---|---|---|---|
| 344,515 | 6/1886 | Biehl | 446/225 |
| 605,438 | 6/1898 | Koehler | 244/31 |
| 2,165,610 | 7/1939 | Boyle | 446/221 X |
| 2,383,390 | 8/1945 | Jacobs | 40/214 |
| 2,629,115 | 2/1953 | Hansen | 40/214 X |
| 2,922,252 | 1/1960 | Van Dam | 428/12 X |
| 3,002,490 | 10/1961 | Murray | 40/214 X |
| 3,176,935 | 4/1965 | White et al. | 244/31 |
| 3,366,999 | 2/1968 | Darby | 446/222 |
| 3,743,827 | 7/1973 | Holtvoigt | 362/311 |
| 4,834,439 | 5/1989 | van de Kamp | 428/43 X |
| 4,876,981 | 10/1989 | Barnhart | 40/214 X |
| 4,879,823 | 11/1989 | Collins | 446/222 |

*Primary Examiner*—Henry F. Epstein
*Attorney, Agent, or Firm*—Cassidy, Vance & Tarleton

[57] ABSTRACT

Balloon decorative devices (10,26) consisting of a lightweight plate-like support element (14), a plurality of flexible ribbon-like streamers (**15*a*–15*f*) fixedly secured at spaced peripheral points about the support element (14) by means of adhesive and/or staples (21), a lightweight stiffener (22) fixedly secured to the free outboard ends of each of the streamers (15*e*–15*f*) by means of adhesive and/or staples (21), a plurality of helium-inflated balloons (12*a*–12*f*) separably attached to the stiffeners (22) on the free ends of respective different ones of the streamers (15*a*–15*f*) so as to form a hanging basket (26) for one or more stuffed animals (28) or similar novelty items, and a central helium-inflated balloon (11) separably attachable to the support element (14) at about the midpoint thereof so as to convert the hanging basket (26) to a balloon simulation of a chandelier (10**).

21 Claims, 4 Drawing Sheets

BALLOON DECORATIVE DEVICES, METHODS AND KITS

BACKGROUND OF THE INVENTION

1. Technical Field

The present invention relates generally to balloons; and, more particularly, to ornamental arrangements of balloons simulating a chandelier or the like which can be used for decorative purposes at parties and similar festive occasions, or for display purposes in retail establishments and the like, as well as to methods and kits for forming such ornamental balloon arrangements.

Ornamental balloon arrangements made in accordance with the present invention can assume a wide range of configurations preferably employing a plurality of helium-inflated (or other lighter-than-air inflation medium) balloons connected either directly to a central plate-like support element or indirectly thereto by means of flexible, swagged ribbon-like streamers formed of crepe paper or the like. In those instances where the arrangement comprises a central helium-inflated balloon affixed directly to the central plate-like support element with a plurality of additional helium-inflated balloons affixed to the periphery of the central plate-like support element by flexible, swagged ribbon-like streamers, the arrangement can assume a chandelier-like configuration wherein the central helium inflated balloon with the plate-like support element affixed to its constricted neck portion rises centrally toward the ceiling, while the additional peripherally mounted helium-inflated balloons are deployed thereabout in any desired pattern—e.g., a circular array, a star-shaped array, an elliptical array, etc.—where the swagged ribbon-like paper streamers define radiating elements similar to the radiating spokes or structural elements of a conventional chandelier which depend from the periphery of the central plate-like support element and then rise upwardly to their respective points of attachment to the peripherally deployed additional helium inflated balloons. Alternatively, the central balloon can be eliminated, in which event the central plate-like support element is suspended from the peripherally deployed additional balloons by means of the ribbon-like paper streamers, thus forming a basket-like arrangement wherein the plate-like support element can be used to support stuffed animals, flowers, gifts, and/or other novelty items.

2. Background Art

There are presently, and for a long time have been, many occasions where individuals desire to decorate party sites, windows and similar store displays, and the like on an inexpensive, yet highly pleasing basis. Balloons have commonly been used for this purpose due to their economy, ease of handling, colorful nature and similar characteristics which have made balloons a widely acceptable means for creating desired aesthetic effects at festive occasions.

Generally, however, when a multiplicity of balloons have been employed for such decorative purposes, the balloons are commonly affixed by paper tape, paper clips, or the like to some type of fixed structural skeleton or to cords or strings attached at their opposite ends to the ceiling, wall, wall moldings, door frames, window frames, or the like. The resulting decorative displays are generally not mobile; and, if mobile, are not capable of being deployed in a wide variety of different configurations.

The use of a single helium-inflated balloon having a suspended basket similar in configuration to conventional large hot air balloons is also known. Again, however, such an arrangement is generally intended for a specific display purpose; and, does not possess sufficient flexibility to enable the "basket" to be supported by a multiplicity of balloons attached to the basket's periphery so as to enable placement of stuffed animals, gifts, and/or other novelty items therein; or, alternatively, wherein the basket defining support can be directly attached to a central helium inflated balloon so as to form a mobile chandelier-like display wherein the balloons can be deployed in any desired configuration.

SUMMARY OF THE INVENTION

The present invention overcomes all of the foregoing disadvantages by providing a simple, effective and economical system for deploying balloons in a wide range of mobile configurations simulating chandelier arrangements and/or permitting display of suspended floral arrangements, stuffed animals and/or similar novelty items.

To this end, the present invention employs: (i) a plurality of helium-inflated balloons; (ii) an inexpensive light-weight central support element similar and/or identical to a paper plate; (iii) a plurality of flexible ribbon-like streamers formed of crepe paper or the like which can be fixedly attached at one end to the periphery of the central plate-like support element by staples, adhesive or the like; and (iv), a plurality of generally rectangular, light-weight stiffeners formed of cardboard, paper or the like fixedly attached to the opposite free ends of respective different ones of the streamers. Preferably each of the plurality of rectangular stiffeners, as well as the plate-like support element, are provided with a small hole, a pair of intersecting through slots, or the like, disposed centrally of the support and stiffeners so as to enable the constricted neck portion and inflation aperture of the helium-inflated balloons to be inserted therethrough. The helium-inflated balloons may be sealed by knotting their constricted necks, by tying off their constricted necks, and/or simply by the pressure applied by the surrounding material of the central plate-like support element and/or stiffeners.

BRIEF DESCRIPTION OF THE DRAWINGS

These and other objects and advantages of the present invention will become more readily apparent upon reading the following Detailed Description and upon reference to the attached drawings, in which.

Figure 1:
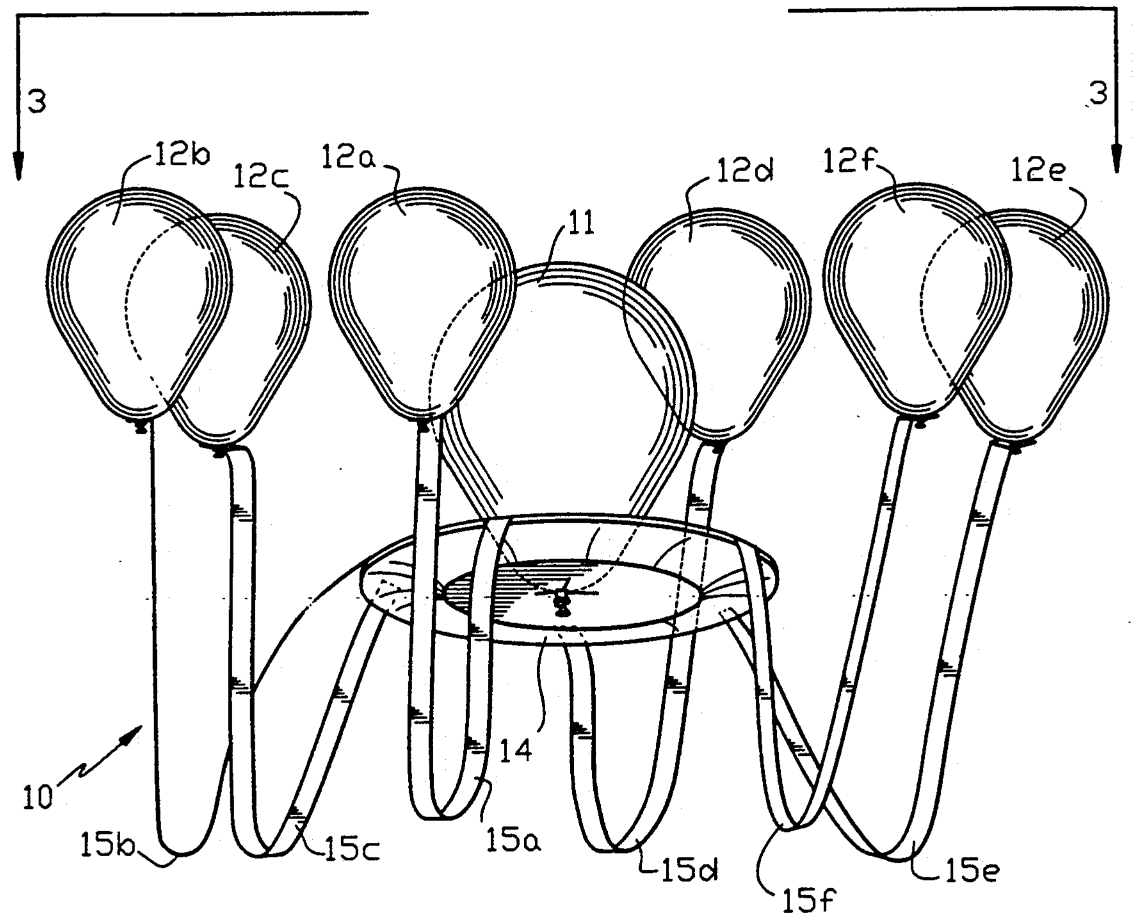
FIG. 1 is an isometric view here depicting a helium-inflated central balloon affixed directly to a central plate-like support element such as a paper plate and a plurality of additional helium-inflated balloons mounted on respective different ones of the free ends of a corresponding plurality of flexible ribbon-like paper streamers depending from, and having their inboard ends fixedly attached to, the periphery of the central plate-like support element, with the entire arrangement being deployed as a mobile balloon chandelier.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and/or alternatives falling within the spirit and scope of the invention as expressed in the appended claims.

DETAILED DESCRIPTION

Turning now to the drawings, and directing attention first to FIG. 1, an exemplary balloon chandelier, generally indicated at 10, embodying the features of the present invention has been depicted. As here illustrated, the exemplary balloon chandelier 10 consists of: (i) seven (7) helium-inflated balloons—viz., a central balloon 11 and six (6) peripherally deployed, outer balloons **12*a*–12*f*; (ii) a centrally located light-weight support element 14 which here takes the form of a paper or paperboard plate or like-shaped disk or web having the central balloon 11 fixedly attached thereto at the center thereof; and (iii), six (6) elongate, flexible, swagged ribbon-like streamers 15*a*–15*f* which may take the form of ribbons of crepe paper or the like having their innermost ends fixedly attached to the central support element 14 about the periphery thereof and their free outboard ends separably attached to respective different ones of the six (6) peripherally deployed balloons 12*a*–12*f*. Thus, the arrangement is such that the balloons 11 and 12*a*–12*f*, the central support element 14, and the ribbon-like streamers 15*a*–15*f* are deployed in a chandelier-like configuration having a central balloon 11, a plurality of peripherally deployed balloons 12*a*–12*f* here arranged in a generally circular array surrounding the central balloon 11, and a plurality of swagged ribbon-like connecting elements 15*a*–15*f* for attaching the outer balloons 12*a*–12*f* to the central support element 14 and, therefore, to the central balloon 11**.

Those skilled in the art will appreciate that the foregoing arrangement is not only highly mobile but, moreover, it may be easily reconfigured to present any one of numerous variable desired decorative effects. Thus, if the user wishes to shift the balloon chandelier 10 from one location to another, it is merely necessary to grasp the central support element 14 and physically carry the assemblage of balloons and streamers to the desired new location. The outermost balloons **12*a*–12*f* can easily be deployed in a circular array as shown; or, if desired, the outermost balloons 12*a*–12*f* can be individually moved closer to or further away from the vertical axis passing through the central balloon 11 and support 14, thus enabling the formation of elliptical, rectangular, square, diamond and/or star-shaped patterns or the like. The arrangement can consist of more or fewer than the illustrative seven (7) balloons shown. The balloons can, of course, be of any desired color or combination of colors; and, one or more of the balloons can include graphic greetings therein such as "Happy Birthday", "Happy Anniversary", or the like. Similarly, the plate-like support element 14 and the streamers can be of any desired color or color combinations; and, of course, the streamers can have the same or different lengths dependent solely upon the artistic effect desired. The outermost balloons 12*a*–12*f* can be moved closer to the central balloon 11** to form a compact array; or, if desired, they can be spread laterally outward to any desired distances.

Figure 2:
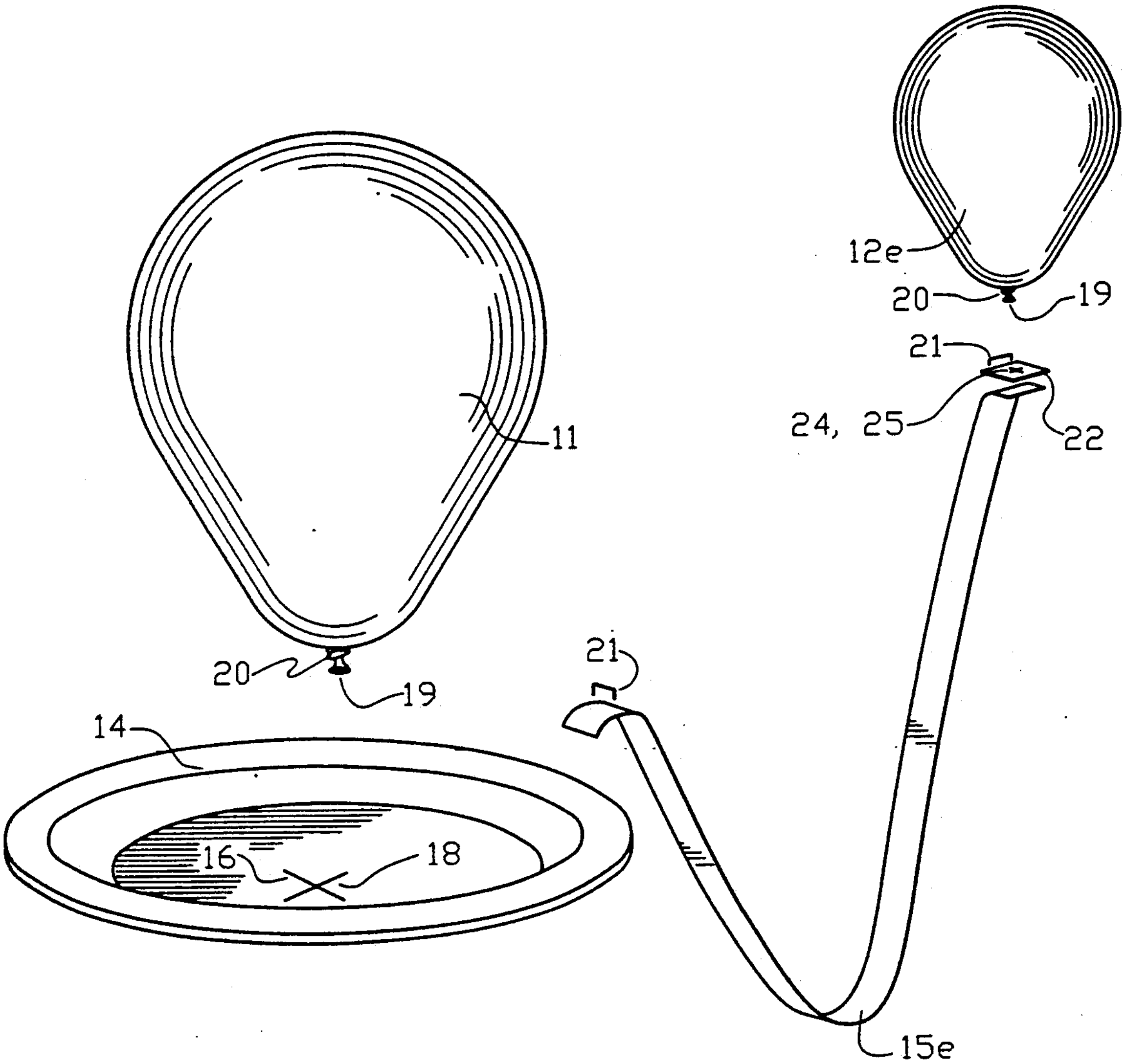
FIG. 2 is a fragmentary, exploded isometric view here depicting the relationship and manner of assembly of the central helium-inflated balloon directly to the central plate-like support element and one of a plurality of additional helium-inflated balloons indirectly to the periphery of the central plate-like support element using an elongate, swagged, flexible, ribbon-like paper streamer, a small rectangular outer stiffening element formed of cardboard, paperboard or the like and adapted to be directly attached to an additional peripherally deployable helium-inflated balloon, and staples used to fasten the inner end of the swagged ribbon-like streamer to the central plate-like support element and the outer end of the streamer to the outboard stiffening element.
Figure 3:
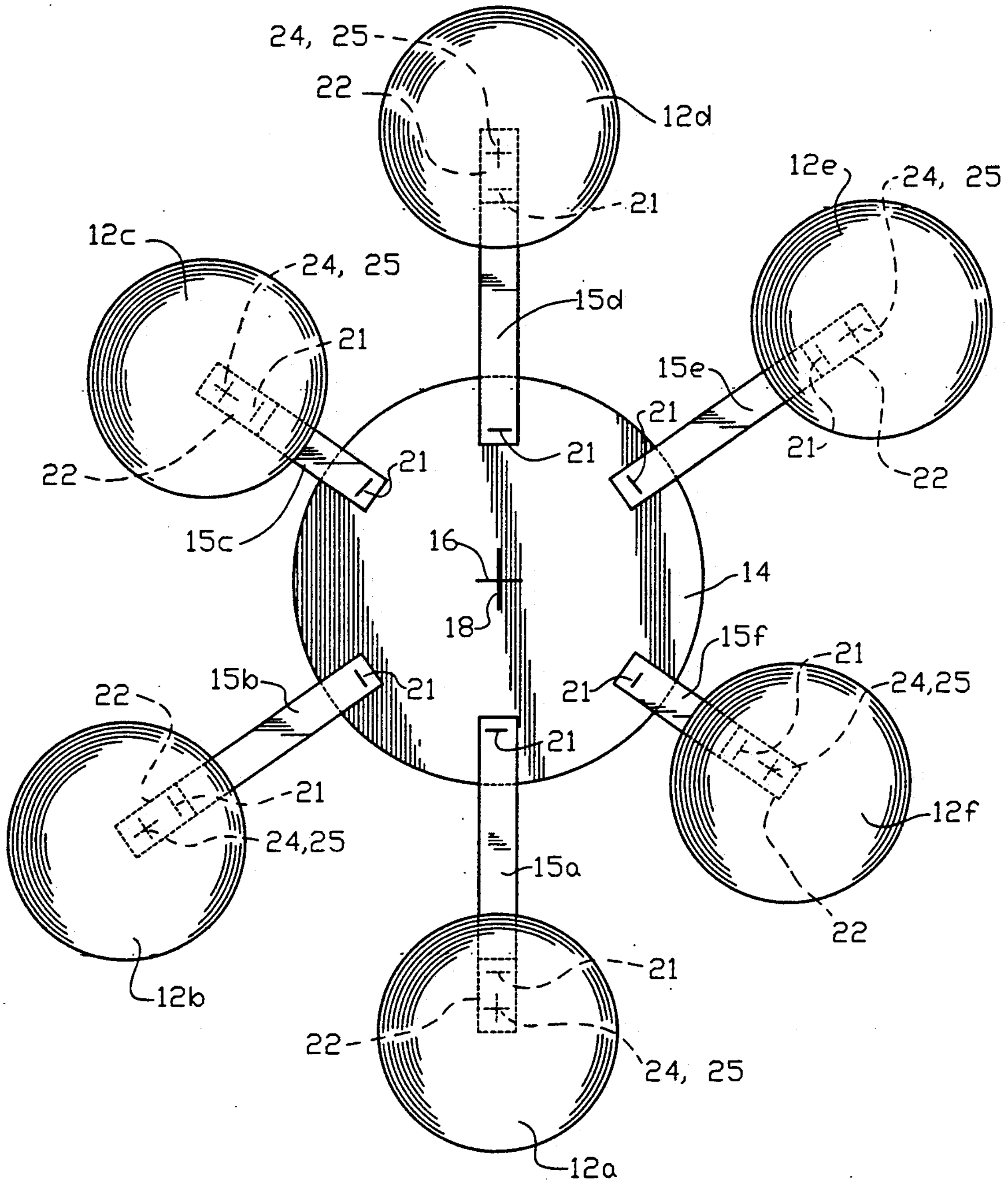
FIG. 3 is a plan view of the exemplary balloon chandelier taken substantially along the line 3—3 in FIG. 1, but wherein the centermost balloon has been removed for purposes of clarity; and, FIG. 4 is an isometric view similar to that shown in FIG. 1, but here depicting the decorative balloon display with the centermost balloon eliminated so that the central plate-like support element is suspended from the lower ends of the ribbon-like streamers attached to the peripherally deployed helium-inflated balloons so as to form a basket within which one or more stuffed animals, floral arrangements, and/or similar gift or novelty items can be positioned.

In carrying out the invention, and as best shown by reference to FIG. 2, the exemplary balloon chandelier 10 of FIG. 1 can be easily assembled from inexpensive material readily available to parents, children, balloon and/or window designers, and like individuals. Thus, the central plate-like support element 14 may simply take the form of a plain or decorative paper plate of any desired size, with the plate preferably being provided with a central through opening or aperture such as here defined by a pair of intersecting slits 16, 18. The central balloon 11, which can again be of any desired shape, color, color combination and/or size, is completely conventional, having an inflation aperture 19 and a constricted neck 20. Thus, following inflation by any suitable lighter-than-air inflation medium e.g., helium—the inflation aperture 19 and constricted neck 20 of the inflated balloon 11 are projected downwardly through the intersecting slits 16, 18, thus fixedly, but separably, attaching the inflated balloon 11 to the center of the plate-like support element 14. If desired, the balloon's constricted neck 20 can be knotted or otherwise tied off prior to insertion through the slits 16, 18 so as to enhance the seal and insure that the balloon 11 remains inflated.

In keeping with the invention, provision is made for enabling ease of attachment of the streamers **15*a*–15*f* and outermost balloons 12*a*–12*f* to the assembly. Thus, the inner end of the flexible ribbon-like streamer 15*e* is fixedly attached to the periphery of the plate-like central support element 14 in any suitable manner such as with adhesive or, as here shown, with one or more staples 21. In order to secure the outermost balloon 12*e* to the free end of the ribbon-like flexible streamer 15*e*, the latter is preferably affixed to a paperboard stiffener, here indicated at 22, again by any suitable means such as adhesive or one or more staples 21. The stiffener 22 is provided with a central through aperture which is here defined by a pair of intersecting slits 24, 25 through which the inflation aperture 19 and constricted neck 20 of the outer balloon 12*e* can be projected so as to fixedly, but separably, connect the balloon 12*e* to the central support 14 by means of the swagged flexible streamer 15*e*. The remaining outer balloons 12*a*–12*d* and 12*f* shown in FIG. 1, or more or fewer outer balloons, are attached to the central support element 14** in precisely the same manner.

Figure 4:
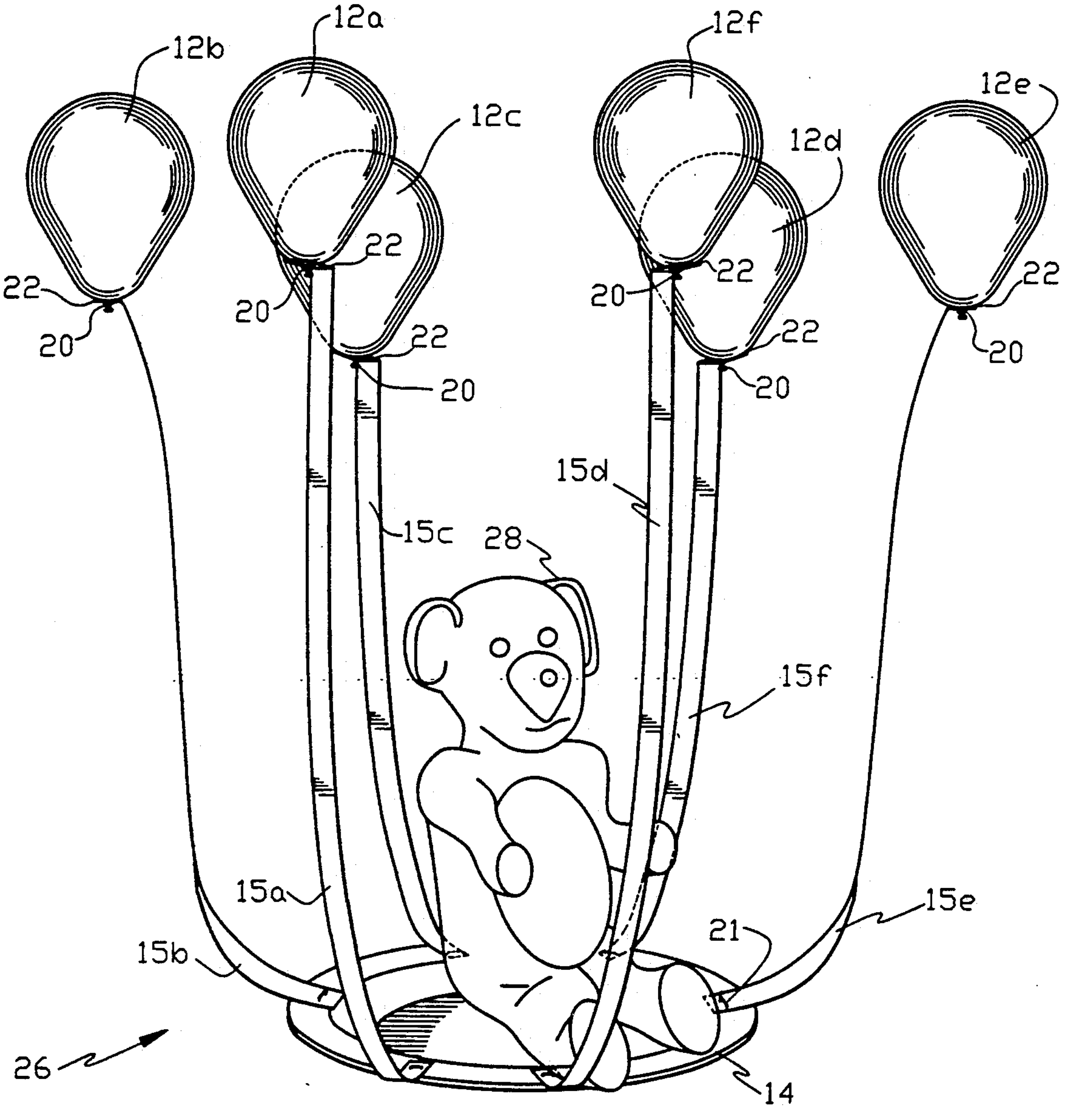

Turning next to FIG. 4, a slightly modified form of the invention has been illustrated. Thus, as here shown, the exemplary decorative or ornamental balloon arrangement is essentially the same as that shown in FIG. 1 except that in this instance the central balloon 11 has been eliminated. As a consequence, the central plate-like support element 14 is suspended from the lower inboard extremities of the plurality of flexible ribbon-like streamers 15a–15f so as to form a hanging basket, generally indicated at 26, thereby enabling the placement of a stuffed animal 28 or other suitable gift, novelty item, real or synthetic floral arrangement, etc. into the basket 26 for display purposes.

Those skilled in the art will appreciate from the foregoing description that there has herein been described a simple, economical yet highly effective decorative display which can be readily configured in any one of numerous different shapes as determined solely by the artistic desires of the user or designer, and which can be formed from readily available inexpensive components having any desired colors or color combinations. The display can take the form of a balloon chandelier or a balloon hanging basket. In either case it is highly mobile and easily assembled and/or disassembled, even by untrained personnel. The ornamental balloon device readily permits of packaging in kit form—i.e., a package containing: (i) a plurality of inflatable balloons; (ii) a plain or decorative central support plate; (iii) a plurality of ribbon-like streamers formed of crepe paper or the like; and (iv), a plurality of small rectangular paperboard stiffeners. Thus, the consumer need only inflate the balloons and assemble the device using a conventional stapler, adhesive or the like.

What is claimed is:

1. An ornamental arrangement of decorative balloons comprising, in combination:

(a) a light-weight support element formed of paperboard in a plate configuration and sized to support a novelty item;

(b) a plurality of first decorative balloons inflated with a lighter-than air inflation medium, said plurality of first decorative balloons being independent of one another and capable of independent movement with respect to one another; and, (c) a corresponding plurality of flexible streamers for securing said plurality of first decorative balloons to said support element with respective different ones of said streamers having a first inboard end secured to said support element at one of a plurality of points spaced about the periphery thereof and a second outboard end separably attached to the constricted neck portion of respective different ones of said plurality of first decorative balloons;

whereby said support element is suspended from said plurality of first decorative balloons and defines a hanging basket capable of supporting one or more stuffed animals, floral arrangements, gifts and similar novelty items.

2. An ornamental arrangement of decorative balloons comprising, in combination:

(a) a light-weight support element formed of paperboard in a plate configuration;

(b) a plurality of first decorative balloons inflated with a lighter-than air inflation medium, said plurality of first decorative balloons being independent of one another and capable of independent movement with respect to one another;

(c) corresponding plurality of flexible streamers for securing said plurality of first decorative balloons to said support element with respective different ones of said streamers having a first inboard end secured to said support element at one of a plurality of points spaced about the periphery thereof and a second outboard end separably attached to the constricted neck portion of respective different ones of said plurality of first decorative balloons;

(d) a second decorative balloon inflated with a lighter-than air-inflation medium; and, (e) means for securing said second decorative balloon to said support element at the approximate midpoint thereof;

whereby said second decorative balloon serves to suspend said support element centrally with respect to said plurality of first decorative balloons and said plurality of first decorative balloons are coupled to the periphery of said support element by said plurality of streamers which are deployed in a swagged configuration so that the assemblage of said first and second decorative balloons, said streamers, and said support element simulate a chandelier configuration.

3. A prepackaged kit for forming at least one of an ornamental decorative balloon chandelier and a decorative balloon hanging basket, said prepackaged kit comprising, in combination:

(a) a plurality of inflatable decorative balloons;

(b) a light-weight support element formed of paperboard in a plate configuration;

(c) a plurality of flexible streamers; and, (d) a package for containing said decorative balloons, support element and streamers;

whereby the purchasing consumer can inflate said decorative balloons with a lighter-than-air inflation medium and: (i) attach at least certain of said inflated decorative balloons to the periphery of the support element with said streamers to form a decorative balloon hanging basket; or (ii), attach one of said inflated decorative balloons to the approximate midpoint of said support element, and attach a plurality of additional inflated decorative balloons to the periphery of said support element with said streamers so as to form a simulated decorative balloon chandelier consisting of said support element, said decorative balloons, and said streamers.

4. The combination as set forth in claims 1 or 2 wherein said plurality of flexible streamers are formed or crepe paper material.

5. The combination as set forth in claim 3 wherein said plurality of flexible streamers are formed of crepe paper material.

6. The combination as set forth in claims 1 or 2 wherein said support element is provided with means defining a through-aperture at the approximate midpoint thereof for permitting the constricted neck portion of one of said balloons, when inflated, to be projected therethrough and captured thereby.

7. The combination asset forth in claim 3 wherein said support element is provided with means defining a through-aperture at the approximate midpoint thereof for permitting the constricted neck portion of one of said balloons, when inflated, to be projected therethrough and captured thereby.

8. The combination as set forth in claims 1 or 2 wherein said streamers are attachable to said support element by first fastening means including at least one of adhesive and staples.

9. The combination as set forth in claim 3 wherein said streamers are attachable to said support element by first fastening means including at least one of adhesive and staples.

10. The combination as set forth in claims 1 or 2 further including a plurality of light-weight stiffeners formed of paperboard, said stiffeners each including means defining a through aperture at the approximate midpoint thereof for permitting the constricted neck portions of at least certain of said balloons, when inflated, to be projected therethrough and captured thereby, said stiffeners being attachable to the free ends of respective different ones of said streamers by second fastening means including at least one of adhesive and staples.

11. The combination as set forth in claim 3 further including a plurality of light-weight stiffeners formed of paperboard, said stiffeners each including means defining a through aperture at the approximate midpoint thereof for permitting the constricted neck portions of at least certain of said balloons, when inflated, to be projected therethrough and captured thereby, said stiffeners being attachable to the free ends of respective different ones of said streamers by second fastening means including at least one of adhesive and staples.

12. The method of forming a decorative balloon simulation of a chandelier, said method comprising the steps of:

(a) inflating a plurality of first decorative balloons with a lighter-than-air inflation medium;

(b) attaching the constricted neck portions of the plurality of inflated first decorative balloons to one end of respective different ones of a corresponding plurality of streamers;

(c) attaching the opposite end of each of the plurality of streamers to the periphery of a light-weight support element formed of paperboard in a plate configuration at a corresponding plurality of spaced peripheral points;

(d) inflating a second decorative balloon with a lighter-than-air inflation medium; and, (e) attaching the second decorative balloon to the approximate midpoint of the support element so as to form a chandelier configuration wherein the second decorative balloon and the support element attached thereto are disposed centrally of the plurality of first decorative balloons, the plurality of first decorative balloons are deployed thereabout and are coupled to the periphery of the support element by the plurality of streamers wit freedom for independent movement with respect to one another, and where the streamers depend at their inboard ends from the periphery of the support element and are secured at their outboard ends to respective different ones of the plurality of first decorative balloons with the streamers being deployed in a swagged configuration.

13. The method of forming a decorative balloon simulation of a hanging basket for displaying at least one of stuffed animals, floral arrangements, gifts and like novelty items, said method comprising the steps of:

(a) inflating a plurality of first decorative balloons with a lighter-than-air inflation medium;

(b) attaching the constricted neck portions of the plurality of inflated first decorative balloons to respective different ones of a plurality of flexible streamers; and, (c) attaching the opposite end of each of the plurality of streamers to a light-weight support element formed of paperboard in a plate configuration at respective different spaced points located about the periphery thereof so that the support element is suspended from the plurality of inflated first decorative balloons by the plurality of streamers to form hanging basket capable of supporting at least one of stuffed animals, floral arrangements, gifts and like novelty items.

14. The method as set forth in claim 12 wherein the second decorative balloon comprises a conventional inflatable decorative balloon having a constricted neck portion terminating in an inflation aperture.

15. The method as set forth in claim 14 wherein the support element is provided with a through aperture at the approximate midpoint thereof and the second inflated decorative balloon is secured thereto by projecting its constricted neck portion through the aperture.

16. The method as set forth in claim 15 wherein the second inflated decorative balloon is sealed by knotting and/or tying off the balloon's constricted neck portion.

17. The method as set forth in claim 13 wherein the plurality of first decorative balloons comprise conventional inflatable decorative balloons each having a constricted neck portion terminating in an inflation aperture.

18. The method as set forth in claim 17 wherein the outboard end of each of the plurality of streamers is attached to a light-weight stiffener formed of paperboard, having a through aperture formed therein, by at least one of adhesive and staples, and wherein the plurality of first inflated decorative balloons are secured to respective different ones of the stiffeners by projecting their constricted neck portions through the aperture formed in stiffeners.

19. The method asset forth in claim 18 wherein the plurality of first decorative balloons are sealed by knotting and/or tying off the balloons' constricted neck portions.

20. The method as set forth in claims 12, 14, 15 and 16 wherein the flexible streamers are formed of crepe paper material.

21. The method as set forth in claims 13, 17, 18 or 19 wherein the flexible streamers are formed of crepe paper material.

* * * * *